Nov. 12, 1963 N. H. YOUNG, JR 3,110,850

TWO DATA CHANNEL SHAFT POSITIONING SYSTEM

Filed April 20, 1953 4 Sheets-Sheet 1

INVENTOR
NORMAN H. YOUNG, JR.
BY Percy P. Lantzy
ATTORNEY

Nov. 12, 1963 N. H. YOUNG, JR 3,110,850

TWO DATA CHANNEL SHAFT POSITIONING SYSTEM

Filed April 20, 1953 4 Sheets-Sheet 2

INVENTOR
NORMAN H. YOUNG, JR.
BY Percy P. Lantzy
ATTORNEY

Nov. 12, 1963 N. H. YOUNG, JR 3,110,850

TWO DATA CHANNEL SHAFT POSITIONING SYSTEM

Filed April 20, 1953 4 Sheets-Sheet 3

INVENTOR
NORMAN H. YOUNG, JR.
BY [signature]
ATTORNEY

INVENTOR
NORMAN H. YOUNG, JR.
BY Percy P. Lantzy
ATTORNEY

United States Patent Office 3,110,850
Patented Nov. 12, 1963

3,110,850 TWO DATA CHANNEL SHAFT POSITIONING SYSTEM

Norman H. Young, Jr., Nutley, N.J., assignor to International Telephone and Telegraph Corporation, a corporation of Maryland Filed Apr. 20, 1953, Ser. No. 349,586
7 Claims. (Cl. 318—16)

This invention relates to communication systems and more particularly to a data communication system whereby the angular position of two remotely located shafts are caused to coincide by means of a digital form of transmission.

Digital pulse communication systems including conventional binary code and cyclic progression code (CP) or staggered step code are known in the art and have been employed heretofore in numerous applications, such as teletype and other various types of intelligence communication. The binary pulse code modulation (PCM) involves the transmission of intelligence or other information by means of on-off pulses. Since the decoding equipment must recognize only the presence or absence of pulses, a very large signal-to-noise improvement is obtainable. Other advantages of binary code are the ease of enciphering intelligence to provide secrecy and the possibility of direct insertion of this digital data into digital type computer for information recognition.

When it becomes necessary to code a signal level occurring between two distinct signal levels, the binary code has the distadvantage of possibly introducing an output error between one and 32 signal levels. This disadvantage has been overcome by the development of the CP code whose primary advantage is that adjacent signal levels are described by codes deferring by only one digit. Hence, in the generation of the code wherever the source calls for a signal exactly on the dividing line between signal levels, the CP code can give only two possible outputs and these outputs will differ by only one signal level. The digital form of transmitting information leading to shaft rotation will find application in numerous fields such as radar, sonar, direction finding, meteorological networks, computing networks, and transmission of highly accurate bearing information from a ground station to an air-craft.

The principles of digital pulse communication and the advantages provided by employing this type of communication lends itself extremely well to the transmission of information relating to shaft rotation. The applications of the system described hereinbelow to accomplish this end are numerous and will be recognized as an improvement over some of the present methods employed in various fields to provide remote control or indication of shaft rotation.

It is an object of this invention to employ the principles of digital pulse communication to cause angular position coincidence between one or more rotating shafts at one given location and one or more corresponding rotating shafts at a distant location.

Another object of this invention is the employment of cyclic progression code to transmit shaft rotation information to a distant receiver wherein the cyclic progression code is converted to a binary code for the decoding operation to produce coincidence of a local shaft rotation with the remotely located shaft rotation.

Still another object is to provide angular position encoders for producing code pulse groups representative of the angular positions of a rotating shaft.

Further objects of this invention is the provision of coding means at the transmitter to translate shaft rotation information directly into a form of digital signal and a transducing means at the receiver to translate digital signal into shaft rotation thereby causing coincidence between the angular positions of the remotely located shafts.

A feature of this invention is the provision of synchro units in each channel having predetermined ratios of operation to regain the shaft rotation described by the electrical input thereto causing direct generation of a digital type code representative of the angular position of the shaft rotation. A digital code is produced by a disc rotated in step with a control shaft having thereon a predetermined code arrangement causing electrical excitation to develop electric pulse codes in accordance with the specific code arrangement carried by said disc. The code pulses representing the angular position of each control shaft are timed division multiplexed with reference to a marker pulse of predetermined distinguishing characteristic and applied to modulate a predetermined carrier signal for transmission.

Another feature of this invention is the provision of a receiver to demodulate the incoming signal into the various code groups and applying these code groups to the appropriate channels which independently actuate a comparator. These comparators compare angular position indications contained in the incoming signal with the actual position of the responsive shaft to be controlled and provides a voltage for proper rotation of this shaft to achieve angular position coincidence between the remotely located shaft.

Further features of this invention include various embodiments of coding means for directly coding shaft rotation employing in conjunction with a rotating disc the television flying spot scanning principles, a binary gear train and switches associated therewith, and predetermined arrangements of coded magnetic inserts and magnetic pick-up or reading units.

The above-mentioned and other features and objects of this invention will become more apparent by reference to the following description taken in conjunction with the accompanying drawings, in which.

Figure 1:
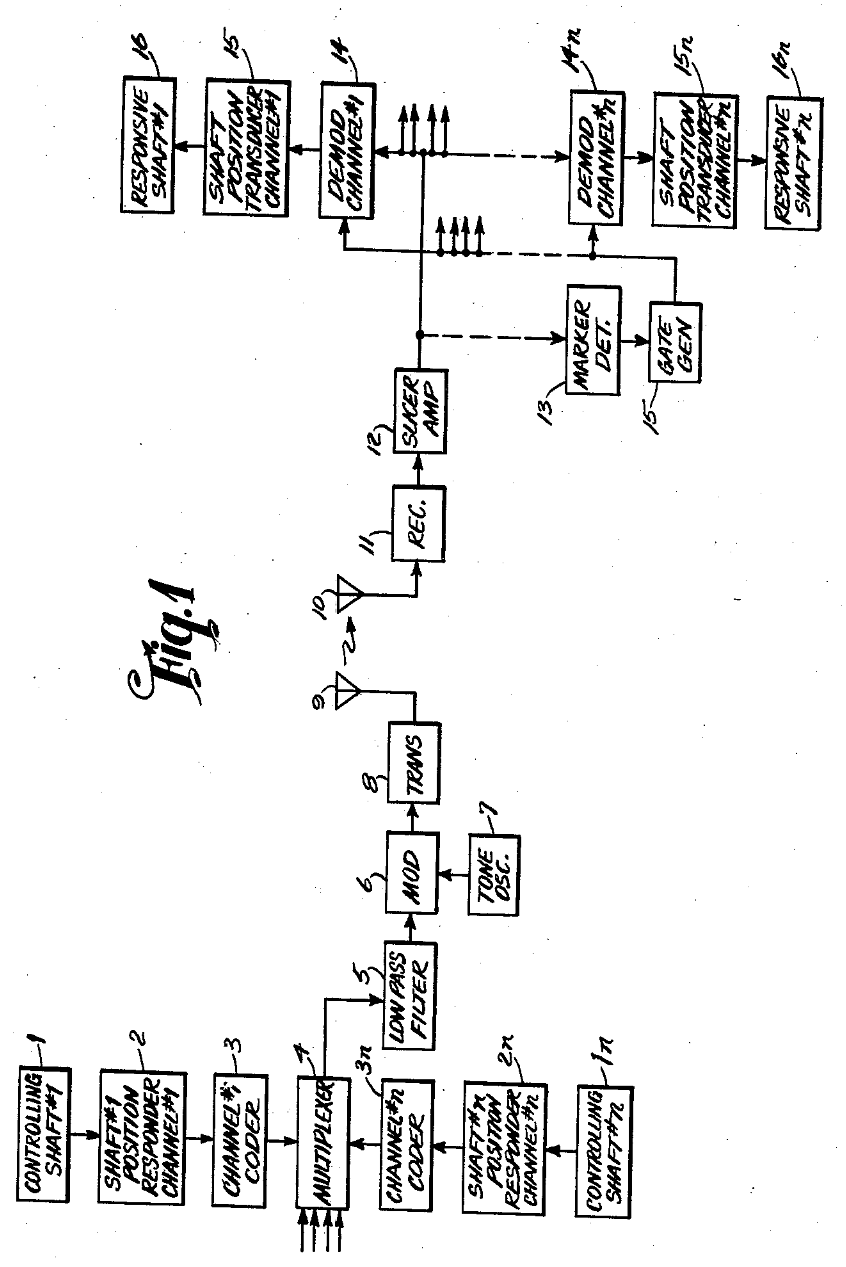
FIG. 1 is a block diagram of a communication system following the principles of this invention.
Figure 2:
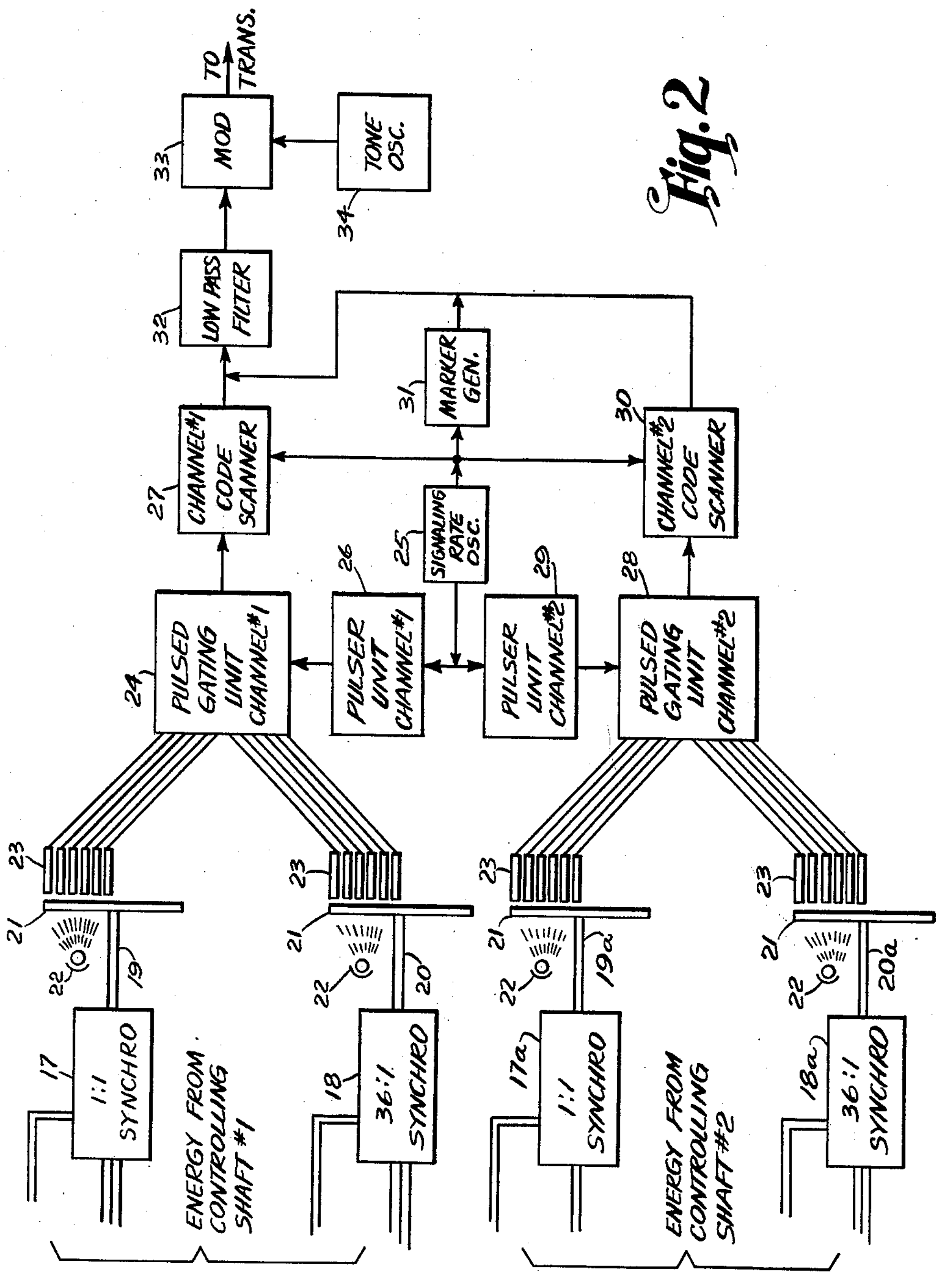
FIG. 2 is a block diagram illustrating in greater detail the components of the transmitting equipment of FIG. 1.
Figure 4:
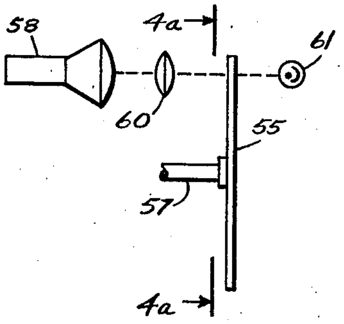
Figure 4A:
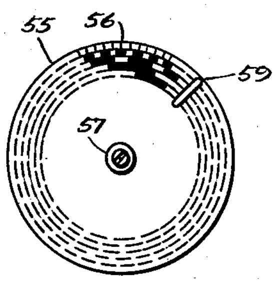
Figure 5:
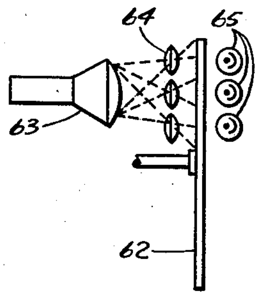
Figure 6:
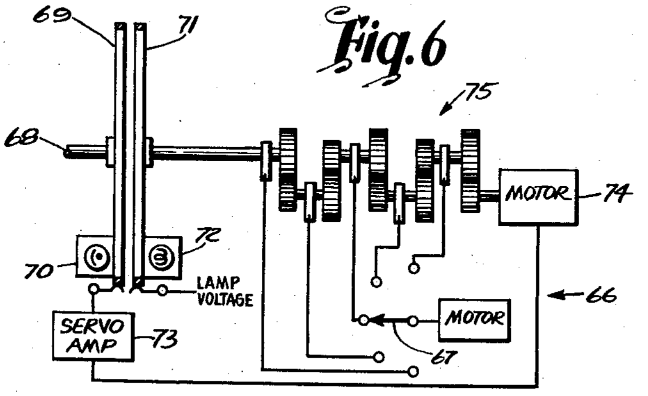
Figure 7:
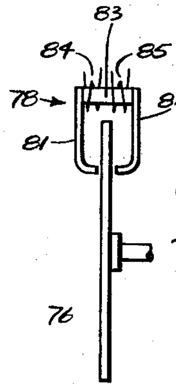
Figure 7A:
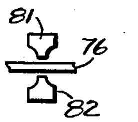
Figure 7B:
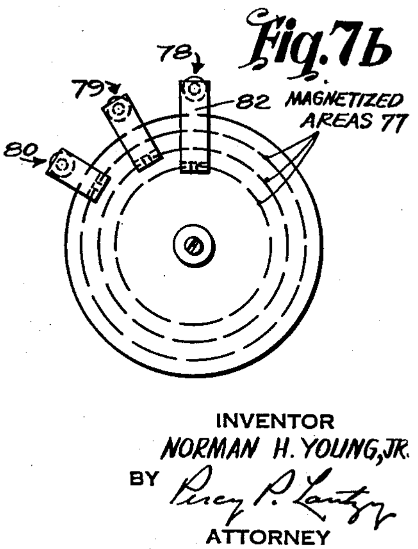

FIGS. 4—4*a*, 5, 6, and 7—7*a*—7*b* are diagrammatic illustrations of various embodiments of the coding device incorporated in FIGS. 1 and 2 wherein FIGS. 4—4*a* and 5 illustrate the employment of flying spot scanning techniques, FIG. 6 illustrates the employment of an electro-optical-mechanical device, and FIGS. 7—7*a*—7*b* illustrate the employment of magnetic principles for directly deriving coded information representative of shaft angular position.

Referring to FIG. 1, a complete communication system is illustrated wherein a plurality of independent shafts, such as control knobs, rotatable antennas, or bearing indicators, may be rotated in a predetermined manner by manual operation or machinery. It should be maintained in mind that plural control shafts are not essential to this invention and is only employed for the purpose of explanation since it is possible to have a single shaft control the position of a responsive shaft following in substantially the same principles as herein described with reference to a plurality of control channels. The angular position of each of such shafts will be transformed into a predetermined digital form of pulse code energy. The coded energy from each said plurality of independent shafts is interleaved in time with reference to a marker pulse for modulation of an oscillating signal for purpose of radio transmission. This radio transmission is received by a distant receiver and the pulse train is derived therefrom. The pulse train is acted upon to obtain the most noise free portion thereof and demodulated in a manner to regain the electrical energy of the pulse code energy which is applied to the appropriate responsive shaft in a manner to provide angular position coincidence thereof with the independent shafts at the transmitter.

The communication system of this invention includes at the transmitting end thereof for purpose of explanation a plurality of rotatable controlling shafts as represented at 1 and 1*n*, a shaft position responders 2 and 2*n* respectively responsive to the angular energy from the controlling shafts through means of mechanical linkages or electro-mechanical devices whereby the output therefrom rotates a portion of coders 3 and 3*n* to be in step with the angular position obtained by shafts 1 and 1*n*. Coders 3 and 3*n* each provide an output therefrom in the form of a digital code pulse group representative of the angular position attained by their respective controlling shafts 1 and 1*n*. The code pulse groups are coupled to multiplexer 4 which operates to form an interleaved code pulse train including the code pulse groups of each coder in a predetermined time sequence. Low pass filter 5 operates on the time sequenced pulse train output of multiplexer 4 in a manner to reduce the bandwidth thereof a predetermined amount in conformance with the transmission requirements, the number of channels contained therein, and the necessary information carried by each channel. The filter 5 may of course be omitted in some applications of the invention where wide bandwidth is permissible. An application of this system may require each channel to include not only coded angular position information of one shaft but may include a second separate code group associated with each shaft to provide a correcting signal for the angular information carried by the first code group if an error beyond certain predetermined limits appears in the angular position information of the first code group.

The output of filter 5 is coupled to modulator 6 wherein a prescribed signal from tone oscillator 7 is modulated in accordance with the code pulse groups. This modulated tone signal is operated on in a conventional manner by transmitter 8 to raise the tone signal plus its modulation to a desired carrier frequency signal for radiation from antenna 9 along the path of a radio link or a wire system. A radio link envisioned for use with this communication system may include any predetermined number of repeater stations between the transmitter and receiver terminal of this system.

Receiving antenna 10 picks up the radiation from transmitter 9 or the last repeater station for application to a conventional receiver 11 wherein the carrier frequency is reduced to a predetermined lower value such that the pulse train thereon may be coupled conveniently to slicer amplifier 12. Slicer 12 operates on the output of receiver 11 to select the most noise free portion of the pulses contained in the pulse train thereby providing an optimum signal-to-noise ratio. It should be understood, however, that while the slicer 12 is desirable for improvement in signal-to-noise ratio, it may be omitted in many applications of the invention.

The output of slicer 12 is conducted simultaneously to marker detector 13 and to a demodulator circuit included in each channel of the receiving equipment represented by demodulators 14 and 14*n*. Detector 13 extracts from the output of slicer 12 the time reference marker which is employed to key gate generator 13*a*. Generator 13*a* may include a delay line for development of appropriately timed gating pulses to accomplish the routing of the code pulse groups through their respective demodulator units. Gating the input to demodulator 14 at the appropriate time provides the code pulse group designated for that particular channel, and in a like manner each demodulator unit will be gated in an appropriate time sequence to present the proper code pulse group to its designated channel.

Where the digital form of transmission is of the pulse code modulation (PCM) type, demodulators 14—14*n* will produce an output directly from the code groups representative of the desired shaft position. However, if a cyclic progression (CP) type of digital transmission is employed the demodulators 14 and 14*n* must incorporate a conversion unit therein whereby the CP code group will be converted to a corresponding PCM code group thereby achieving the advantages of the CP code for the coding operation and the advantages of the PCM code for the decoding and transducing operation.

The resultant electrical output is coupled to shaft position transducers 15—15*n* for predetermined action upon responsive shafts 16—16*n* through means of either a mechanical linkage or an electromechanical device. Transducers 15—15*n* preferably provides therein means to compare the incoming electrical angular position information with the actual angular position of their respective associated shafts 16—16*n*. This comparison would result in the necessary energy to cause shafts 16—16*n* to assume the angular position dictated by the electrical energy obtained from the coded information. By incorporating in transducers 15—15*n* means to compensate for any resultant delay in the system, the angular position of shafts 16—16*n* after responding to the output of transducers 15—15*n* will coincide with the angular position achieved by their corresponding transmitter end shafts 1—1*n*, respectively.

Considering with a greater degree of particularity the circuitry incorporated in the transmitting equipment attention is now transferred to FIG. 2 wherein an embodiment of the transmitting group is illustrated for remote control of two rotatable shafts. It should be remembered that although this embodiment illustrates a two channel system, expansion or decrease thereof to include any desired number of channels or a single channel may be accomplished within the limits determined by the allowable bandwidth of the radiated signal.

FIG. 2 illustrates a block diagram of the transmitting equipment included in our data communication system wherein synchro devices are employed to regain a shaft rotation of a controlling shaft by an electrical input to a portion of synchro systems as shown at synchros 17 and 18. The output shafts 19 and 20 of these synchro units are used to generate the desired digital form of code directly in response to the electrical input to synchros 17 and 18. The term synchro used herein is a generic term used by the Navy to describe a rotary inductor used to transmit angular information or torque or remote points.

To provide an accurate indication of the rotating of the control shaft two synchro units are employed in a manner wherein synchro 17 has a transformation ratio of 1:1 and synchro 18 has a transformation ratio of 36:1 which cooperate in such a manner that synchro 18 will not take control unless there is an error of $\pm 5°$ in the angular position information translated by synchro 17. Synchro 18 will operate in a manner to have a corrective effect upon the coding of the angular position of the controlling shaft. Channel two is shown to include substantially identical arrangements of synchro units as shown by synchros 17*a* and 18*a* which control the rotation of the output shafts 19*a* and 20*a* for coding the angular position information transmitted thereto from control shaft number two. The cooperation of synchros 17—18 and 17*a*—18*a* cooperate in a manner to give an overall accuracy for the production of a six digit digital code of $\pm 0.08°$ for the code representing the angular position of their respective controlling shaft.

Associated with the control shafts 19, 19*a* and 20, 20*a* are coding wheels or discs 21 having thereon the desired form of digital code arranged along the desired number of radial lines, each of said radial lines representing the signal levels of a particular digital code. For purpose of illustration the code contained by each of said discs will be produced by an appropriate punching of holes along sixty-four radial lines of each wheel to form a six digit CP code. The rotation of these wheels will correspond to the rotation of the controlling shaft through means of its associated synchro units in such a manner that the code developed therefrom through cooperation of an electro-optical system will represent a particular angular position attained by the controlling shaft.

The electro-optical system herein includes a source of light 22 associated with each of discs 21 disposed on one side thereof and six photo electric cells 23 located on the opposite side of discs 21 disposed in a manner whereby each of the six photo cell 23 will develop an electrical signal in the form of a pulse when light passes through the discs from source 22, each photo cell 23 activated in accordance to the code configuration for a particular digit included in the six digit CP code.

The output from photo cells 23 cooperating with synchro units 17 and 18 for channel one are fed to pulsed gating unit 24 whose operation is controlled by signal rate oscillator 25 operating at a sampling rate of 20 cycles per second based on necessary calculations using a maximum acceleration of wheels 21 of ten a.p.m. and a pulse unit 26 for channel one to properly locate the respective coded outputs of synchro units 17 and 18 in timed sequence. The output of pulse gating unit 24 is fed to code scanner 27 which in turn is controlled by oscillator 25 to assure the proper location of the code pulse groups with respect to their relative data information contained therein. Similar circuitry composed of pulse gate unit 28, pulser unit 29 and code scanner 30 controlled in a similar manner by signal rate oscillating 25 produces a code pulse group output representative of the angular position obtained by the controlling shaft of channel two. Code scanners 27 and 30 cooperate under the influence of oscillator 25 to assure the proper time sequence of the two distinct code pulse groups of each channel.

Signal rate oscillator 25 activates marker generator 31 in a manner to produce a pulse having a distinguishing characteristic for employment in a distant receiver for establishing synchronization between the transmitter and receiver. The output from marker generator 31 and the outputs from code scanners 27 and 30 are interleaved on a time division basis producing an output equivalent to a twenty-four pulse signal plus the marker pulse. Lowpass filter 32 is utilized to reduce the bandwidth occupied by the interleaved pulses. The code pulse train is fed to modulator 33 for modulation of tone oscillator 34. The modulated signal from modulator 33 is provided with the proper output level to fully modulate the radio transmitter to attain optimum signal-to-noise ratio.

Figure 3:
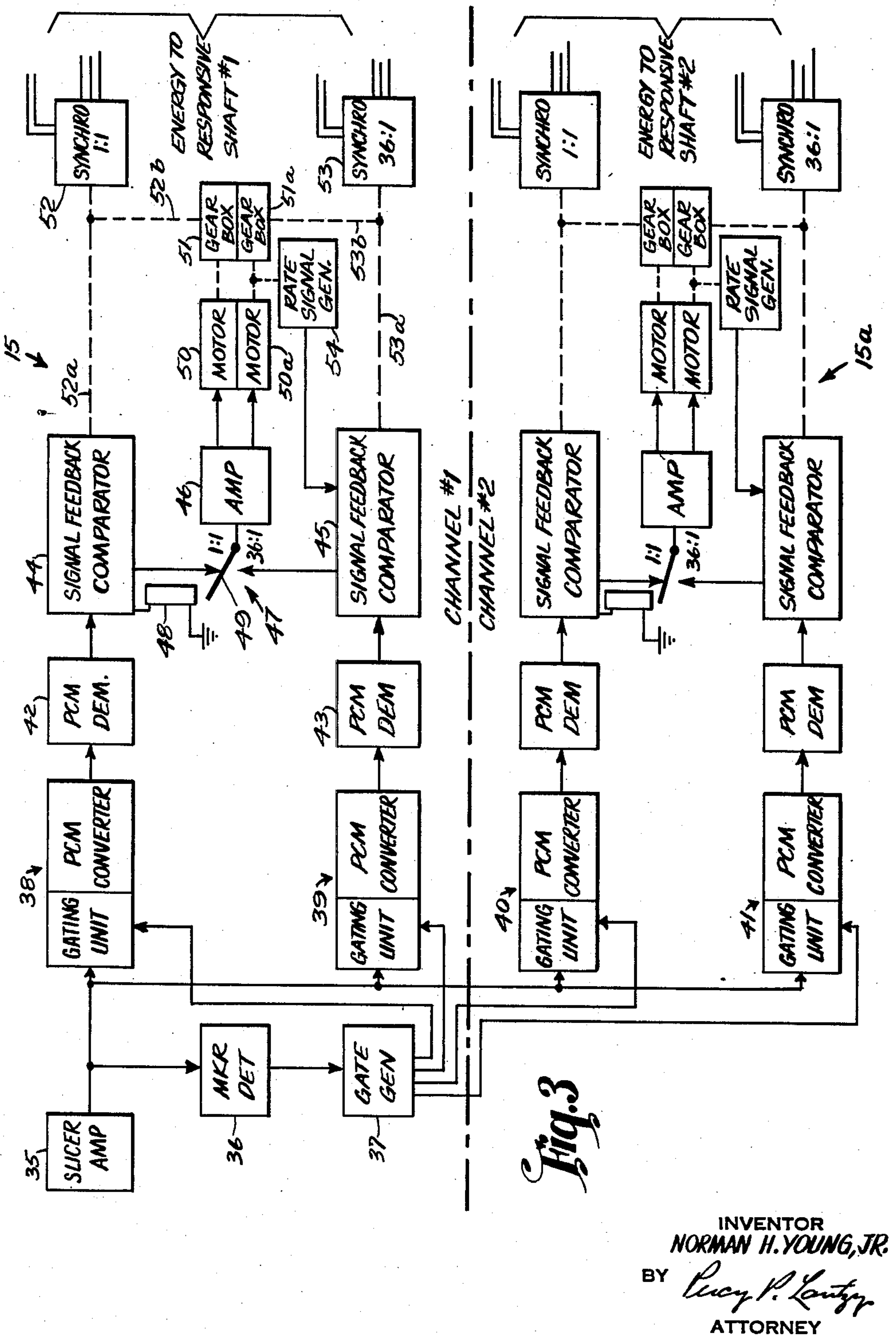
FIG. 3 is a block diagram showing in greater detail the components of the receiving equipment of FIG. 1.

The signal radiated from the radio transmitter will travel along a given radio link and may encounter repeater stations in certain applications wherein the radiation will be operated upon to maintain a given signal level and eventually will be received by the receiver equipment at a terminal station. The equipment at the receiver terminal is illustrated in block form by FIG. 3. As hereinabove mentioned in connection with FIG. 1 the received radiation is coupled from antenna 10 to receiver 11 wherein the R-F carrier is reduced to an approximate IF signal carrying thereon the pulsed modulation representative of the angular position of a plurality of controlling shafts located at the transmitting end of this communication system. The code pulse train is applied to slicer amplifier 35 wherein the most noise free section of the pulses included in the interleaved code pulse groups is selected to give optimum signal-to-noise ratio at the receiving end of this communication system. The characteristic pulse generated by marker generator 31 at the transmitter is removed from the interleaved code pulse signal by marker detector 36 to establish a time reference or synchronization at the receiver. The output of detector 36 operates gate generator 37 in a manner to gentrate the required number of gating pulses to allow separation of the time division multiplexed code groups. In this particular example of the operation of this communication system generator 37 will develop four gating pulses to provide proper operation upon the time division multiplexed code groups consisting of the 1:1 and 36:1 code groups for both channels one and two.

The gating pulses of generator 37 are appropriately applied to gating unit and PCM converts 38 and 39 of channel one and gating unit and PCM converters 40 and 41 of channel two to accomplish selection of the proper 1:1 and 36:1 code groups for each channel and to convert the CP code groups to corresponding binary PCM code groups. The conversion of CP code to PCM code may be accomplished readily with a flip-flop or multivibrator type circuit.

In describing the further operation of the receiver equipment, our discussion will deal with channel one with it being understood that the functioning of the identical circuitry in channel two will be substantially the same. The outputs from devices 38 and 39 are applied to PCM demodulators 42 and 43, the signal to demodulator 42 consisting of code pulse groups representing the angular position of the controlling shaft as recognized by synchro 17 and the signal applied to demodulator 43 will consist of code pulse groups representative of the corrective angular position information as recognized by synchro 18 of FIG. 2. The demodulated signals are fed respectively into signal feedback comparators 44 and 45 which operate to compare the received signal angular position information with the responsive shaft angular position information as represented by a voltage derived in comparators 44 and 45 from the corresponding angular position of mechanical coupling 52*a*. If an error is recognized in this comparison an error signal is fed to amplifier 46 by means of relay 47. When comparator 44 is activated by a code pulse group relay coil 48 will be activated in a manner to close switch 49 as illustrated thereby causing an error signal to flow from comparator 44 to amplifier 46. The output of amplifier 46 driving a motor 50 which in turn is mechanically linked to a predetermined gear box 51 in a manner to control the rotor of synchro unit 52 through mechanical linkages 52*a* and *b* causing an approximate electrical signal to be coupled to the receiver portion of synchro 52 for controlling the angular position of responsive shaft 16.

The lack of a code pulse group at comparator 44 will deactivate relay 47 causing a completion of the circuit between comparator 45 and amplifier 46. During such a time comparator 45 will be under influence of code pulse groups representative of the angular position error recognized by synchro 18. A resultant comparison will take place between the angular position of the rotor of synchro unit 53 as represented by the voltage developed in comparator 45 by mechanical linkage 53*a* and the input signal wherein an error signal, if present, will activate motor 50*a* through amplifier 46 in a manner to cause a correcting motion to be placed upon synchro unit 53 through gear box 51*a* and mechanical linkages 53*a* and *b* causing responsive shaft 16 to correct its position in a manner to coincide with the angular position of controlling shaft 1 of FIG. 1.

As is known the time required for the signal to travel from the transmitter equipment to the receiving equipment will provide a constant time delay thereby presenting a constant error throughout the system. Rate signal generator 54 coupled to motor 50*a* provides the proper voltage for coupling to comparator 45 in a manner whereby a correction will be applied to synchro 53 to compensate for the always present constant time delay, the value of said time delay being dependent upon the distance between transmitting and receiving equipment.

FIGS. 4—4*a*, 5, 6, and 7—7*a*—7*b* illustrate various embodiments for translating controlling shaft angular position directly into coded pulses consistant with a predetermined digital form of transmission.

FIG. 4—4*a* indicates a coder embodiment employing television flying spot scanning techniques for the generation of code pulse groups indicative of the angular position attained by the controlling shaft. Disc 55 of transparent material is provided with opaque and transparent areas in a pattern corresponding to the pulse code desired as indicated at 56 in FIG. 4*a*. Disc 55 is rotated by input shaft 57 consistant with the angular position attained by controlling shaft 1 as coupled thereto by a known mechanical linkage or synchro system.

A cathode ray tube 58 having a phospher with short persistance is placed in position so that the image of its flying spot may be projected on the disc 55. When scanned in an appropriate manner the spot image moves radially on disc 55 as indicated by area 59. A lens 60 may be provided between the tube 58 and disc 55 for focusing the resultant light upon the face of disc 55. As the flying spot passes over the face of disc 55 the light therefrom is passed or intercepted by the transparent or opaque areas, respectively, depending upon the digital code employed to indicate the angular position of the disc. The passage of light through transparent areas of the disc 55 will represent a predetermined code consistant with the angular position attained by disc 55 and will be recognized by photo cell 61 disposed on the opposite side of disc 55. The output of photocell 61 upon activation by light passing through transparent areas will consist of a series of pulses dependent upon the type of digital code employed, thereby, directly developing a code pulse group representative of the angular position attained by the control shaft.

FIG. 5 illustrates another embodiment of a coding means employing television flying spot techniques wherein the digits of a predetermined code are arranged to produce a coarse, medium, fine indication of the angular position attained by the control shaft which is represented by the angular position of disc 62 in a manner similar to that described in connection with FIG. 4. In a six digital code the first two digits would provide a coarse indication, the third and fourth digit would provide a medium indication while the fifth and sixth digit would provide a fine indication of the angular position attained by the control shaft. An appropriate combination of the digits of other types of codes such as a three digit code or multiples thereof could be employed to provide the desired coarse, medium, fine indication of angular position.

Incorporated with the code disc 62 a scanning or cathode ray tube 63 is provided having disposed in front of its screen three lenses 64 in a manner whereby the light from the scanning spot will be focused upon the digits of the code in a manner substantially as shown to give three separate indications of the angular position obtained by the disc 62, thereby, providing a coarse, medium, and fine indication when the resultant light passing through transparent areas activating photo cells 65. This type of indication may be advantageous where nine teletype channels are to be used simultaneously for transmission of the angular position to a remote responsive shaft.

FIG. 6 illustrates an electrical-mechanical-optical type of coding means which may be incorporated in the communication system herein described. In such a system a motor driven switch assembly 66 is employed to generate a binary arrangement of open and closed circuits, which is scanned at a predetermined rate by a motor driven commutator 67 to generate binary pulses.

The input shaft 68 similar to shaft 19 of FIG. 2 rotates a disc 69 containing thereon one opaque sector and one transparent sector with a photoelectric cell 70 disposed thereon behind the dividing line between the areas. A second disc 71 facing disc 69 has a light source 72 associated thereon projecting a small point or line of light toward disc 69. If the light from source 72 strikes the transparent sector of disc 69 it illuminates photo cell 70. The electrical output from cell 70 activates a servo system or amplifier 73 which may include a negative feedback arrangement. The output of servo amplifier 73 actuates motor 74 driving disc 71 through a binary train of gears 75 in a manner to position disc 71 so that the line of light is just at the dividing line between the transparent and opaque sectors of disc 69. Thus the position of disc 71 bears an exact relationship to that of the input shaft 68. At any instant, the position of disc 71 is recorded by the arrangement of closed and open circuits in the switches 66 associated with the driving gear train 75. The closed and opened circuit arrangement is recognized and obtained by scanning the contacts of switch 66 with commutator 67 at the scanning speed required for the operation of this system. This system provides a pulse output directly in the form required for binary pulse codes, namely, the absence or presence of pulses appearing across the output terminals. In many other comparable systems the output is in the form of an electrical voltage wave which must be used to actuate a relay before obtaining the coded pulse output.

FIGS. 7, 7*a*, and 7*b* illustrate a further embodiment of coding means applicable to producing digital code groups indicative of the angular position attained by a rotating shaft for application in a communication system illustrated in FIG. 1. A disc 76 similar to the disc illustrated in FIG. 4*a* or an endless tape, coated with a high coercive force magnetic material to be positioned by the control shaft through means of a mechanical linkage or a synchro system similar to the synchro system illustrated in FIG. 2. The predetermined digital code employed on the magnetic material is obtained by providing magnetized areas 77 in a radial manner as indicated for the code of disc 55 in FIGS. 4—4*a*. The reading heads 78, 79, and 80 as indicated in FIG. 7*a* are positioned around the disc substantially as shown to provide a coarse, medium, fine indication of the attained angular position. The reading head 78 may consist of yoke portions 81 and 82 having tapered portions adjacent disc 76 with a saturable magnetic material 83 disposed opposite the reading end in the magnetic circuit of portions 81 and 82. This element is saturated ± depending on the disc portion encountered. A square wave into a winding 84 would produce negative or positive pulses in winding 85 depending on the polarity of saturation of saturable material 83. Winding 85 plus corresponding wirings on reading heads 79 and 80 are connected to conventional circuitry for production of the digital code desired to transmit the angular position of the controlling shaft to a remotely located responsive shaft in accordance with the communication system of this invention.

At the receiving end of the system each of the coding means embodiments illustrated in FIGS. 4—4*a*, 5, 6, and 7—7*a*—7*b* have a counterpart or analogue which will provide proper demodulation of the received code pulse groups. One representative analogue of the coding means illustrated in FIG. 6 may be achieved by converting the code modulation to a direct current voltage employing conventional code translating devices wherein the resulting D.-C. potential could be employed to operate a self-balancing D.-C. bridge type of servo system. The employment of such a system would require the necessity of using coarse, medium, and fine information for coupling to separate servo system whose outputs would be combined in a precision gear train for angular positioning of the responsive shaft.

Another analogue of the mechanical binary code generator of FIG. 6 employed in the receiver would include a mechanical binary code generator identical to the coder shown in FIG. 6 wherein the resulting binary number is fed to a simple binary computor together with the incoming binary pulse code. In the computor these signals would be subtracted and the residue error used to actuate a servo system in reduction of this error to zero.

While I have described above the principles of my invention in connection with specific apparatus, it is to be clearly understood that this description is made only by way of example and not as a limitation to the scope of my invention as set forth in the objects thereof and in the accompanying claims.

I claim:

1. A data communication system comprising a controlling shaft, two data channels for said controlling shaft, one channel for approximate position data and the other channel for vernier position data, coding means for deriving respectively a digital form of code pulse group representative of the approximate position of said controlling shaft and a digital form of code pulse group representative of the vernier position of said controlling shaft, means to transmit said code pulse groups, means to receive the transmitted code pulse groups, two responsive channels one for approximate position data and the other channel for vernier position data, a responsive shaft, means for applying said code pulse groups to their respective ones of said responsive channels, said responsive channels each including decoder means to decode the code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analogue quantity to produce a control signal, and means responsive to the control signal of its respective channel to control the angular position of said responsive shaft in accordance with the magnitude and sense of said control signal.

2. A data communication system comprising a controlling shaft, two data channels for said controlling shaft, one channel for approximate position data and the other channel for vernier position data, coding means for deriving respectively a digital form of code pulse group representative of the approximate position of said controlling shaft and a digital form of code pulse group representative of the vernier position of said controlling shaft, means to interleave the code pulse groups of said channels in time sequence, means to transmit said time sequential code pulse groups, means to receive the transmitted code pulse groups, two responsive channels one for approximate position data and the other channel for vernier position data, a responsive shaft, means for separating said code pulse groups for application to respective ones of said responsive channels, said responsive channels each including decoder means to decode the code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analogue quantity to produce a control signal, and means responsive to the control signal of its respective channel to control the angular position of said responsive shaft in accordance with the magnitude and sense of said control signal.

3. A data communication system comprising a controlling shaft, two data channels for said controlling shaft, one channel for approximate position data and the other channel for vernier position data, independent coding means included in each of said channels deriving respectively a digital form of code pulse group representative of the approximate position of said controlling shaft and a digital form of code pulse group representative of the vernier position of said controlling shaft, means to interleave the code pulse groups of said channels in time sequence, means to transmit said time sequential code pulse groups, means to receive the transmitted code pulse groups, two responsive channels one for approximate position data and the other channel for vernier position data, a responsive shaft, means for separating said code pulse groups for application to respective ones of said responsive channels, said responsive channels each including decoder means to decode the code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analogue quantity to produce a control signal, and means responsive to the control signal of its respective channel to control the angular position of said responsive shaft in accordance with the magnitude and sense of said control signal.

4. A data communication system comprising a controlling shaft; two data channels for said controlling shaft, one channel for approximate position data and the other channel for vernier position data; coding means for deriving respectively a digital form of code pulse group representative of the approximate position of said controlling shaft and a digital form of code pulse group representative of the vernier position of said controlling shaft; means to transmit said code pulse groups; means to receive the transmitted code pulse groups; two responsive channels one for approximate position data and the other channel for vernier position data; a responsive shaft; means for applying said code pulse groups to their respective ones of said responsive channels, said responsive channels each including decoder means to decode the code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analogue quantity to produce a control signal, and means responsive to the control signal of its respective channel to control the angular position of said responsive shaft in accordance with the magnitude and sense of the control signal; and means responsive to said first analogue quantity in one of said responsive channels to sequentially control said responsive shaft for approximate position and then vernier position.

5. A data communication system comprising a controlling shaft; two data channels for said controlling shaft, one channel for approximate position data and the other channel for vernier position data; coding means for deriving respectively a digital form of code pulse group representative of the approximate position of said controlling shaft and a digital form of code pulse group representative of the vernier position of said controlling shaft; means to interleave the code pulse groups of said channels in time sequence; means to transmit said time sequential code pulse groups; means to receive the transmitted code pulse groups; two responsive channels one for approximate position data and the other channel for vernier position data; a responsive shaft; means for separating said code pulse groups for application to respective ones of said responsive channels, said responsive channels each including decoder means to decode the code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analogue quantity to produce a control signal, and means responsive to the control signal of its respective channel to control the angular position of said responsive shaft in accordance with the magnitude and sense of the control signal; and means responsive to said first analogue quantity in one of said responsive channels to sequentially control said responsive shaft for approximate position and then vernier position.

6. A data communication system comprising a controlling shaft; two data channels for said controlling shaft, one channel for approximate position data and the other channel for vernier position data; independent coding means included in each of said channels for deriving respectively a digital form of code pulse group representative of the approximate position of said controlling shaft and a digital form of code pulse group representative of the vernier position of said controlling shaft; means to interleave the code pulse groups of said channels in time sequence; means to transmit said time sequential code pulse groups; means to receive the transmitted code pulse groups; two responsive channels one for approximate position data and the other channel for vernier position data; a responsive shaft; means for separating said code pulse groups for application to respective ones of said responsive channels, said responsive channels each including decoder means to decode the code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analogue quantity to produce a control signal, and means responsive to the control signal of its respective channel to control the angular position of said responsive shaft in accordance with the magnitude and sense of the control signal; and means responsive to said first analogue quantity in one of said responsive channels to sequentially control said responsive shaft for approximate position and then vernier position.

7. A data communication system comprising a controlling shaft; two data channels for said controlling shaft, one channel for approximate position data and the other channel for vernier position data; coding means for deriving respectively a cyclic permutation code pulse group representative of the approximate position of said controlling shaft and a cyclic permutation code pulse group representative of the vernier position of said controlling shaft; means to transmit said code pulse groups; means to receive the transmitted code pulse groups; two responsive channels one for approximate position data and the other channel for vernier position data; a responsive shaft; means for applying said code pulse groups to their respective ones of said responsive channels; said responsive channels each including means to convert said cyclic permutation code pulse groups to binary code pulse groups, decoder means to decode said binary code pulse groups of the corresponding channel to obtain a first analogue quantity indicative of the controlling shaft position, means to obtain a second analogue quantity indicative of the position of said responsive shaft, comparison means coupled to said decoder means to compare said first analogue quantity with said second analoque quantity to produce a control signal, and means responsive to the control signal of its respective channel to control the angular position of said responsive shaft in accordance with the magnitude and sense of the control signals; and means responsive to said first analogue quantity in one of said responsive channels to sequentially control said responsive shaft for approximate position and then vernier position.

References Cited in the file of this patent

UNITED STATES PATENTS

| | | |
|---|---|---|
| 2,405,617 | Singer | Aug. 13, 1946 |
| 2,446,532 | Edwards | Aug. 10, 1948 |
| 2,533,242 | Gridley | Dec. 12, 1950 |
| 2,537,427 | Seid | Jan. 9, 1951 |
| 2,548,661 | Feldman | Apr. 10, 1951 |
| 2,575,342 | Gridley | Nov. 20, 1951 |
| 2,625,600 | Benaglio | Jan. 13, 1953 |
| 2,630,481 | Johnson | Mar. 3, 1953 |
| 2,659,072 | Coales | Nov. 10, 1953 |
| 2,685,054 | Brenner et al. | July 27, 1954 |
| 2,711,499 | Lippel | June 21, 1955 |
| 2,815,486 | Estes | Dec. 3, 1957 |

FOREIGN PATENTS

| | | |
|---|---|---|
| 653,909 | Great Britain | May 30, 1951 |